(12) United States Patent
Matsumura et al.

(10) Patent No.: US 11,729,764 B2
(45) Date of Patent: Aug. 15, 2023

(54) TERMINAL, RADIO COMMUNICATION METHOD AND BASE STATION

(71) Applicant: NTT DOCOMO, INC., Tokyo (JP)

(72) Inventors: Yuki Matsumura, Tokyo (JP); Hideyuki Moroga, Tokyo (JP); Satoshi Nagata, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 7 days.

(21) Appl. No.: 17/045,000

(22) PCT Filed: Apr. 5, 2018

(86) PCT No.: PCT/JP2018/014647
§ 371 (c)(1),
(2) Date: Oct. 2, 2020

(87) PCT Pub. No.: WO2019/193736
PCT Pub. Date: Oct. 10, 2019

(65) Prior Publication Data
US 2021/0168837 A1 Jun. 3, 2021

(51) Int. Cl.
*H04W 72/1268* (2023.01)
*H04B 1/713* (2011.01)
*H04L 5/00* (2006.01)

(52) U.S. Cl.
CPC ........ *H04W 72/1268* (2013.01); *H04B 1/713* (2013.01); *H04L 5/0048* (2013.01); *H04L 5/0078* (2013.01); *H04L 5/0098* (2013.01); *H04B 2201/698* (2013.01)

(58) Field of Classification Search
CPC .......... H04W 72/1268; H04W 72/0493; H04B 1/713; H04B 2201/698; H04L 5/0048; H04L 5/0078; H04L 5/0098; H04L 5/0012; H04L 5/0044; H04L 5/0094; H04L 5/0051
See application file for complete search history.

(56) References Cited

U.S. PATENT DOCUMENTS

| 8,437,379 | B2 | 5/2013 | Nanri |
| 2017/0373715 | A1 | 12/2017 | Moroga et al. |
| 2018/0220414 | A1* | 8/2018 | Yin ........................ H04L 5/0053 |

(Continued)

FOREIGN PATENT DOCUMENTS

WO  2016-121911 A1  8/2016

OTHER PUBLICATIONS

Office Action issued in Chilean Application No. 202002559; dated Nov. 15, 2021 (22 pages).

(Continued)

*Primary Examiner* — Ajit Patel
*Assistant Examiner* — Wilfred Thomas
(74) *Attorney, Agent, or Firm* — Osha Bergman Watanabe & Burton LLP

(57) ABSTRACT

A terminal is disclosed including a processor that assumes a position of an additional demodulation reference signal (DMRS) based on a value corresponding to whether frequency hopping is enabled or disabled; and a transmitter that transmits the additional DMRS according to an allocation duration of an uplink shared channel (PUSCH). In other aspects, a radio communication method and a base station are also disclosed.

10 Claims, 11 Drawing Sheets

(56) References Cited

U.S. PATENT DOCUMENTS

| | | | | |
|---|---|---|---|---|
| 2019/0165896 | A1* | 5/2019 | Huang | H04W 72/0413 |
| 2019/0190663 | A1* | 6/2019 | Sahlin | H04L 1/1812 |
| 2020/0128567 | A1* | 4/2020 | Zhu | H04W 72/1268 |
| 2020/0178092 | A1* | 6/2020 | Ren | H04W 24/02 |
| 2020/0252254 | A1* | 8/2020 | Hasegawa | H04L 5/0094 |
| 2021/0385827 | A1* | 12/2021 | Liang | H04W 72/0453 |

OTHER PUBLICATIONS

3GPP TS 36.300 V8.12.0 "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)" Mar. 2010 (149 pages).

3GPP TSG-RAN1 Meeting #92; R1-1803555 "draftCR to 38.214 capturing the Jan. 18 ad-hoc and RAN1#92 meeting agreements" Nokia; Athens; Feb. 26-Mar. 1, 2018 (4 pages).

3GPP TS 38.214 V15.0.0 "3rd Generation Partnership Project; Technical Specification Group Radio Access Network NR; Physical layer procedures for data (Release 15)" Dec. 2017 (71 pages).

3GPP TS 38.211 V15.1.0 "3rd Generation Partnership Project; Technical Specification Group Radio Access Network NR; Physical channels and modulation (Release 15)" Mar. 2018 (90 pages).

International Search Report issued in International Application No. PCT/JP2018/014647, dated Jun. 12, 2018 (3 pages).

Written Opinion issued in International Application No. PCT/JP2018/014647; dated Jun. 12, 2018 (4 pages).

Extended European Search Report issued in counterpart European Patent Application No. 18913979.3, dated Oct. 13, 2021 (7 pages).

Nokia, Nokia Shanghai Bell; "On the remaining details of long PUCCH for UCI more than 2 bits"; 3GPP TSG RAN WG1 #91, R1-1721475; Reno, Nevada, USA; Nov. 27-Dec. 1, 2017 (15 pages).

Office Action issued in Japanese Application No. 2020-511563; dated Jul. 5, 2022 (6 pages).

Office Action in counterpart Chile Patent Application No. 202002559 dated Aug. 10, 2022 (15 pages).

Office Action in counterpart India Patent Application No. 202037044130 dated Aug. 23, 2022 (7 pages).

Office Action issued in counterpart Korean Patent Application No. 10-2020-7029910 dated Oct. 25, 2022 (10 pages).

Office Action issued in counterpart Japanese Patent Application No. 2020-511563 dated Jan. 10, 2023 (4 pages).

Huawei et al.; "On uplink hopping and DVRB"; 3GPP TSG RAN WG1 Meeting 91, R1-1719829; Reno, USA Nov. 27-Dec. 1, 2017 (4 pages).

3GPP TS 38.214 V1.3.0; "3rd Generation Partnership Project; Technical Specification Group Radio Access Network NR; Physical layer procedures for data (Release 15)"; Dec. 2017 (71 pages).

Nokia et al.; "Further comments on DM-RS for NR physical data channels"; 3GPP TSG RAN WG1 Meeting #92, R1-1802560; Athens, Greece; Feb. 26-Mar. 2, 2018 (13 pages).

* cited by examiner

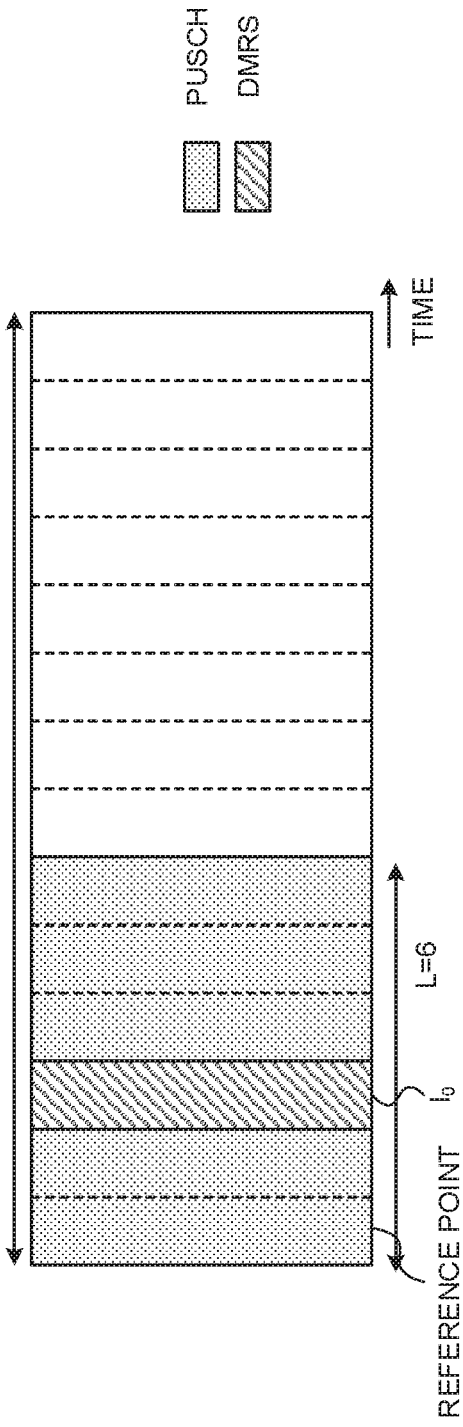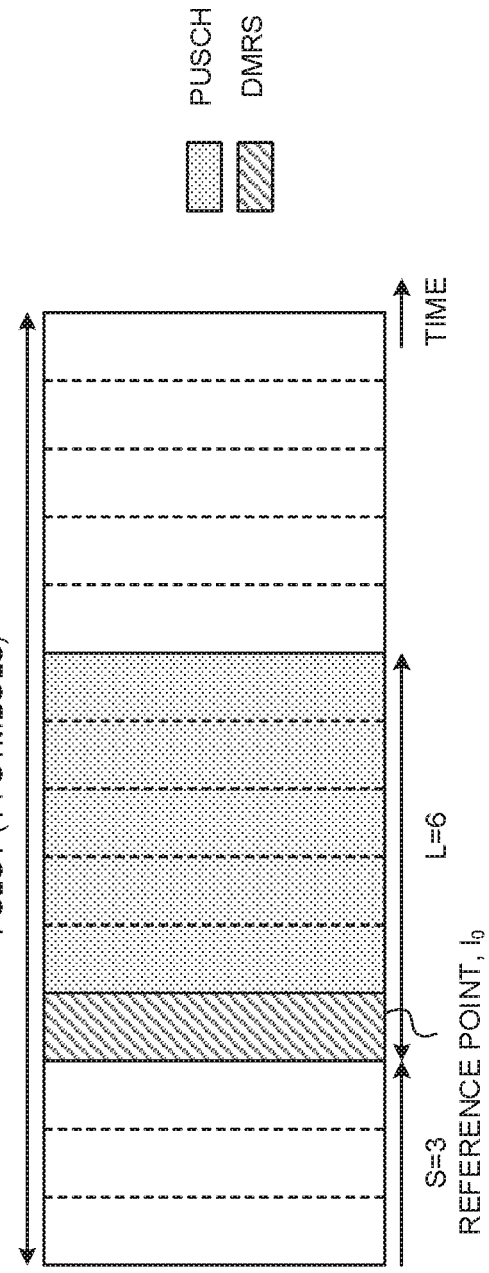

FIG. 2A

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | 1 | 2 | 3 | 0 | 1 | 2 | 3 |
| <4 | - | - | - | - | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, [4] | $l_0$, [4] | $l_0$, [4] |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, [7] | $l_0$, [7] | $l_0$, [7] | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

FIG. 2B

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | | 1 | | 0 | | 1 | |
| | First hop | Second hop | First hop | Second hop | First hop | Second hop | First hop | Second hop |
| ≤3 | - | - | - | - | $l_0$ | 0 | - | - |
| 4 | $l_0$ | 0 | - | - | $l_0$ | 0 | - | - |
| 5, 6 | $l_0$ | 0 | - | - | $l_0$ | 0 | $l_0$, $l_0$+4 | 0, 4 |
| 7 | $l_0$ | 0 | $l_0$, $l_0$+4 | 0, 4 | $l_0$ | 0 | $l_0$, $l_0$+4 | 0, 4 |

FIG. 3A

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | 1 | 2 | 3 | 0 | 1 | 2 | 3 |
| <4 | - | - | - | - | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$,[4] | $l_0$,[4] | $l_0$,[4] |
| 6 | $l_0$ | $l_0$ | $l_0$ | $l_0$ | $l_0$ | $l_0$,4 | $l_0$,4 | $l_0$,4 |
| 7 | $l_0$ | $l_0$ | $l_0$ | $l_0$ | $l_0$ | $l_0$,4 | $l_0$,4 | $l_0$,4 |
| 8 | $l_0$ | $l_0$,[7] | $l_0$,[7] | $l_0$,[7] | $l_0$ | $l_0$,6 | $l_0$,3,6 | $l_0$,3,6 |
| 9 | $l_0$ | $l_0$,7 | $l_0$,7 | $l_0$,7 | $l_0$ | $l_0$,6 | $l_0$,3,6 | $l_0$,3,6 |
| 10 | $l_0$ | $l_0$,9 | $l_0$,6,9 | $l_0$,6,9 | $l_0$ | $l_0$,8 | $l_0$,4,8 | $l_0$,3,6,9 |
| 11 | $l_0$ | $l_0$,9 | $l_0$,6,9 | $l_0$,6,9 | $l_0$ | $l_0$,8 | $l_0$,4,8 | $l_0$,3,6,9 |
| 12 | $l_0$ | $l_0$,9 | $l_0$,6,9 | $l_0$,5,8,11 | $l_0$ | $l_0$,10 | $l_0$,5,10 | $l_0$,3,6,9 |
| 13 | $l_0$ | $l_0$,11 | $l_0$,7,11 | $l_0$,5,8,11 | $l_0$ | $l_0$,10 | $l_0$,5,10 | $l_0$,3,6,9 |
| 14 | $l_0$ | $l_0$,11 | $l_0$,7,11 | $l_0$,5,8,11 | $l_0$ | $l_0$,10 | $l_0$,5,10 | $l_0$,3,6,9 |

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | | 1 | | 0 | | 1 | |
| | First hop | Second hop | First hop | Second hop | First hop | Second hop | First hop | Second hop |
| ≤3 | - | - | - | - | $l_0$ | 0 | $l_0$ | 0 |
| 4 | $l_0$ | 0 | $l_0$ | 0 | $l_0$ | 0 | $l_0$ | 0 |
| 5, 6 | $l_0$ | 0 | $l_0$ | 0 | $l_0$ | 0 | $l_0$, $l_0$+4 | 0, 4 |
| 7 | $l_0$ | 0 | $l_0$, $l_0$+4 | 0, 4 | $l_0$ | 0 | $l_0$, $l_0$+4 | 0, 4 |

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | 1 | 2 | 3 | 0 | 1 | 2 | 3 |
| <4 | - | - | - | - | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, [4] | $l_0$, [4] | $l_0$, [4] |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, [7] | $l_0$, [7] | $l_0$, [7] | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | | 1 | | 0 | | 1 | |
| | First hop | Second hop | First hop | Second hop | First hop | Second hop | First hop | Second hop |
| ≤3 | - | - | - | - | $l_0$ | 0 | - | - |
| 4 | $l_0$ | 0 | - | - | $l_0$ | 0 | - | - |
| 5, 6 | $l_0$ | 0 | - | - | $l_0$ | 0 | $l_0, l_0+4$ | 0, 4 |
| 7 | $l_0$ | 0 | $l_0, l_0+4$ | 0, 4 | $l_0$ | 0 | $l_0, l_0+4$ | 0, 4 |

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | | 1 | | 0 | | 1 | |
| | First hop | Second hop | First hop | Second hop | First hop | Second hop | First hop | Second hop |
| ≤3 | - | - | - | - | $l_0$ | 0 | $l_0$ | 0 |
| 4 | $l_0$ | 0 | $l_0$ | 0 | $l_0$ | 0 | $l_0$ | 0 |
| 5, 6 | $l_0$ | 0 | $l_0$ | 0 | $l_0$ | 0 | $l_0, l_0+4$ | 0, 4 |
| 7 | $l_0$ | 0 | $l_0, l_0+4$ | 0, 4 | $l_0$ | 0 | $l_0, l_0+4$ | 0, 4 |

(4)  (1)  (3) (2)  (1)

TERMINAL, RADIO COMMUNICATION METHOD AND BASE STATION

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A or LTE Rel. 10, 11, 12 and 13) has been specified.

LTE successor systems (also referred to as, for example, Future Radio Access (FRA), 5th generation mobile communication system (5G), 5G+ (plus), New Radio (NR), New radio access (NX), Future generation radio access (FX) or LTE Rel. 14, 15 or subsequent releases) have been also studied.

Legacy LTE systems (e.g., LTE Rel. 8 to 13) perform communication on Downlink (DL) and/or Uplink (UL) by using a subframe (also referred to as a TTI: Transmission Time Interval) of 1 ms. This subframe is a transmission time unit of 1 channel-coded data packet, and is a processing unit of scheduling, link adaptation or retransmission control (HARQ: Hybrid Automatic Repeat reQuest).

Furthermore, a radio base station (e.g., eNode B (eNB)) controls allocation (scheduling) of data for a user terminal (UE: User Equipment), and notifies the UE of a data scheduling instruction by using Downlink Control Information (DCI). When, for example, receiving DCI (also referred to as a UL grant) for instructing UL transmission, the UE that complies with legacy LTE (e.g., LTE Rel. 8 to 13) transmits UL data in a subframe that comes a given duration after (e.g., after 4 ms).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (e.g., NR) to support frequency hopping of a UL channel (also referred to as, for example, a UL shared channel (PUSCH: Physical Uplink Shared Channel) and/or a UL control channel (PUCCH: Physical Uplink Control Channel), or an uplink signal) to obtain a frequency diversity gain.

Furthermore, it has been studied for NR to flexibly control allocation of data (e.g., PUSCH). For example, it has been also studied to control allocation of data in a unit of 1 or more symbols (also referred to as, for example, mini slots) included in a slot.

However, when at least one of frequency hopping and allocation in the symbol unit is applied to a UL channel, a problem is how to control a Demodulation Reference Signal (DMRS) of the UL channel. When the DMRS is not appropriately arranged, there is a risk that the UL channel cannot be appropriately demodulated and communication quality deteriorates.

It is therefore one of objects of the present disclosure to provide a user terminal and a radio communication method that can appropriately arrange a DMRS of a UL channel.

Solution to Problem

A user terminal according to one aspect of the present disclosure includes: a transmitting section that transmits an uplink shared channel and a Demodulation Reference Signal (DMRS) of the uplink shared channel; and a control section that determines allocation of the DMRS based on a given value and an allocation duration of the uplink shared channel at least before Radio Resource Control (RRC) connection is configured, and the given value is separately defined according to at least one of each mapping type of the uplink shared channel and whether or not frequency hopping is applied.

Advantageous Effects of Invention

According to the present invention, it is possible to appropriately arrange a DMRS of a UL channel.

BRIEF DESCRIPTION OF DRAWINGS

FIGS. 1A and 1B are diagrams for explaining a PUSCH mapping type.

FIGS. 2A and 2B are diagrams illustrating one example of tables that define numbers and positions of DMRSs and additional DMRSs.

FIGS. 3A and 3B are diagrams illustrating another example of the tables that define the numbers and the positions of the DMRSs and the additional DMRSs.

FIG. 4 is a diagram illustrating another example of the tables that define the numbers and the positions of the DMRSs and the additional DMRSs.

FIGS. 5A and 5B are diagrams illustrating another example of the tables that define the numbers and the positions of the DMRSs and the additional DMRSs.

DESCRIPTION OF EMBODIMENTS

Figure 6:
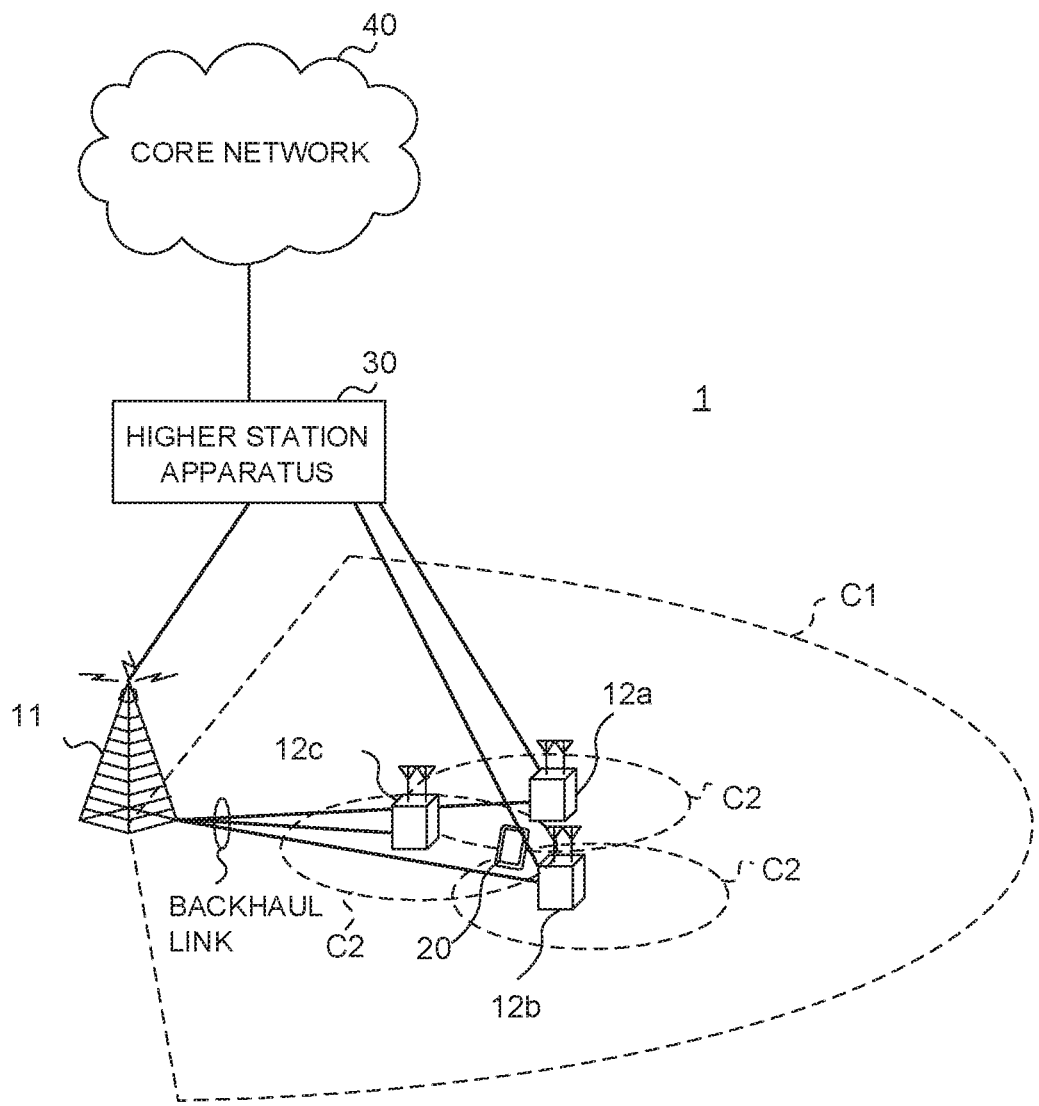
FIG. 6 is a diagram illustrating one example of a schematic configuration of a radio communication system according to one embodiment of the present invention.

It has been studied for future radio communication systems (e.g., LTE Rel. 14, 15 or subsequent releases, 5G and NR that will be also referred to as NR) to transmit, for example, data by using slot-based scheduling and mini slot-based scheduling.

A slot is one of basic transmission units, and 1 slot includes a given number of symbols. For example, a slot duration includes a first number of symbols (e.g., 14 symbols) for a normal CP, and a slot duration includes a second number of symbols (e.g., 12 symbols) for an extended CP.

The mini slot corresponds to a duration including the number of symbols that is a given value (e.g., 14 symbols (or 12 symbols)) or less. In one example, the mini slot may include a given number of symbols (e.g., the number of symbols such as 2, 4 or 7) for DL transmission (e.g., PDSCH transmission).

As data (e.g., PUSCH) allocation, different resource allocation types (e.g., a type A and a type B) may be configured to be applied.

For example, a case where the type A (also referred to as a PUSCH mapping type A) is applied to UL (e.g., PUSCH transmission) is assumed. In this case, a PUSCH start position in a slot is selected from fixed symbols (e.g., a symbol index #0) configured in advance, and the number of PUSCH allocation symbols (e.g., PUSCH length) is selected from a range from a given value (Y) to 14 (see FIG. 1A).

FIG. 1A illustrates a case where PUSCHs are allocated to a head symbol to a sixth symbol (symbols #0 to #5) of the slot. Thus, according to the PUSCH mapping type A, although the PUSCH start position is fixed, the PUSCH length (L=6 in this case) is flexibly configured. In addition, Y may be a value (Y>1) larger than 1, or may be 1 or more. For example, Y may be 4.

According to the type A, Demodulation Reference Signals (DM-RSs) used for PUSCH demodulation are arranged on one or more symbols (also referred to as DMRS symbols). A first DMRS symbol ($l_0$) may be indicated by a higher layer parameter (e.g., UL-DMRS-typeA-pos). For example, the higher layer parameter may indicate that $l_0$ is one of 2 and 3 (i.e., the higher layer parameter may indicate that the first DMRS symbol is one of symbol indices 2 and 3).

Furthermore, according to the type A, DMRSs may be arranged on one or more additional symbols in addition to the first DMRS symbol ($l_0$). At least one of the number and positions of the additional DMRS symbols may be notified from a base station to a UE by a higher layer signaling. For example, the UE determines at least one of the number and the positions of the additional DMRSs based on a PUSCH allocation duration (e.g., the number of symbols), and information related to the number of additional DMRSs notified by the higher layer parameter (e.g., UL-DMRS-add-pos). UL-DMRS-add-pos may be read as DM-RS-add-pos or dmrs-AdditionalPosition.

Furthermore, according to the type A, positions 1 in a time direction of the DMRS symbols may be defined by using a start symbol (symbol #0) of a slot as a reference (reference point).

Next, a case where the type B (also referred to as a PUSCH mapping type B) is applied to UL (e.g., PUSCH transmission) is assumed. In this case, the number of PUSCH allocation symbols (e.g., PUSCH length) is selected from a number of candidate symbols (the number of symbols that is 1 to 14) configured in advance. A PUSCH start position in a slot is configured to one of locations (symbols) of the slot (see FIG. 1B).

FIG. 1B illustrates a case where the PUSCH start symbol is a given symbol (the symbol #3 (S=3)), and the number of symbols to be contiguously allocated from the start symbol is 4 (L=6). Thus, according to the PUSCH mapping type B, the PUSCH start symbol (S) and the number of symbols (L) that continues from the start symbol are notified from the base station to the UE. The number of symbols (L) that continues from the start symbol will be also referred to as a PUSCH length. Thus, according to the PUSCH mapping type B, the PUSCH start position is flexibly configured.

According to the type B, DMRSs used for PUSCH demodulation are arranged on one or more symbols (also referred to as DMRS symbols). The first DMRS symbol ($l_0$) for the DMRS may be a fixed symbol. For example, the first DMRS symbol may be equal to the PUSCH start symbol ($l_0=0$ may hold).

Furthermore, according to the type B, the DMRSs may be arranged on one or more additional symbols in addition to the first symbol ($l_0$). At least one of the number and positions of the additional DMRS symbols may be notified from the base station to the UE by a higher layer signaling. For example, the UE determines at least one of the number and the positions of the additional DMRSs based on a PUSCH allocation duration (e.g., the number of symbols) and information related to the number of additional DMRSs notified by a higher layer parameter (e.g., UL-DMRS-add-pos).

Furthermore, according to the type B, the positions 1 in the time direction of the DMRS symbols may be defined by using a start symbol (the symbol #3 in FIG. 1B) of scheduled PUSCH resources as a reference (reference point).

Information (S) indicating a start symbol of data (e.g., PUSCH) and information (L) indicating a data length (or information a combination set of S and L) may be notified from the radio base station to the user terminal. In this case, the radio base station may configure a plurality of candidates (entries) that are combinations of the start symbol (S) and the data length (L) to the user terminal in advance by a higher layer signaling, and notify the user terminal of information that indicates a specific candidate by downlink control information. In addition, the type B assumes a plurality of combinations of a PUSCH length and a start positon (e.g., 105 patterns).

Furthermore, which PUSCH mapping type is used may be configured by a higher layer signaling (e.g., higher layer signaling), may be indicated by DCI, or may be recognized based on a combination of the higher layer signaling and the DCI.

As described above, it is considered that the LE determines an additional LAIRS configuration (e.g., at least one of the number and the positions of DMRSs) based on information notified by a higher layer signaling. More specifically, the UE may determine the number and the positions of additional DMRSs referring to a table (see FIGS. 2A and 2B) defined in advance based on information (e.g., DMRS-add-pos) notified by a higher layer signaling, the PUSCH allocation duration (e.g., the number of symbols) and the mapping type.

FIG. 2A corresponds to a table that defines positions of DMRSs for PUSCH demodulation in a case where frequency hopping is not applied, and FIG. 2B corresponds to a table that defines positions of DMRSs for PUSCH demodulation in a case where frequency hopping is applied. The positions of the DMRSs are defined based on the PUSCH allocation duration (the number of symbols), the mapping type and the information (e.g., DMRS-add-pos) notified by the higher layer signaling. DMRS-add-pos may be a maximum number of additional DMRSs. In addition, DMRS symbol positions are not limited to these in FIG. 2. In, for example, FIG. 2A, at least one of [4] in which the PUSCH allocation duration of the mapping type B corresponds to 5 additional DMRS symbols, and [7] in which the PUSCH allocation duration of the mapping type A corresponds to 8 additional DMRS symbols may be a different value.

On the other hand, it is considered to perform transmission by using a physical shared channel (e.g., PUSCH) even before Radio Resource Control (RRC) connection is configured (this will be also described to read "before RRC connection" or "before the UE obtains dedicated RRC"). A PUSCH that is transmitted before the RRC connection is, for example, a random access procedure (e.g., message 3). In addition, in this description, the PUSCH that is transmitted before the RRC connection may be read as a PUSCH that is not scheduled by a PDCCH that is scrambled by a Cell-Radio Network Temporary Identifier (C-RNTI) or a Configured Scheduling RNTI (CS-RNTI) and to which Cyclic Redundancy Check (CRC) is applied.

It is considered to arrange a DMRS for demodulating a PUSCH even during PUSCH transmission before RRC connection. Furthermore, from a viewpoint to prevent deterioration of communication quality, it is preferable to employ a configuration where additional DMRSs are allocated according to a PUSCH allocation duration (e.g., the number of symbols).

However, it is not possible to notify the UE of DMRS-add-pos by using a higher layer signaling before RRC connection. Therefore, a problem is how to control the additional DMRS configuration in a case where the additional DMRSs are configured for PUSCH transmission.

Hence, the inventors of this application have focused on that it is not possible to notify the UE of information (e.g., DMRS-add-pos) related to a configured number (e.g., maximum number) of additional DMRSs before RRC connection, and conceived determining allocation of the DMRSs based on at least one of a given value defined in advance and a PUSCH allocation duration (e.g., the number of symbols).

Furthermore, it has been studied for NR to apply frequency hopping (also referred to FH below) to PUSCHs to obtain a frequency diversity gain. For example, DMRS arrangements in a case where FH is applied to the PUSCHs and a case where FH is not applied are assumed. When FH is applied, a DMRS is preferably allocated to a PUSCH associated with each hop (e.g., a first hop and a second hop to be arranged at different frequencies).

The inventors of this application have focused on that it is preferable to separately control a DMRS configuration (e.g., the number of additional DMRSs and positions of the additional DMRSs) in the case where FH is applied, and a DMRS configuration in the case where FH is not applied. Alternatively, the inventors of this application have focused on that it is preferable to separately control the DMRS configurations based on the mapping types. Furthermore, it is considered that FH is applied even during PUSCH transmission (e.g., message 3 in the random access procedure) before RRC connection.

Furthermore, the inventors of this application have focused on that it is not possible to notify the UE of information (e.g., DMRS-add-pos) related to the maximum number of additional DMRSs before RRC connection, and it is possible to apply FH. In light of this matter, the inventors of this application have conceived separately defining given values in the case where FH is applied and in the case where FH is not applied, and determining allocation of DMRSs in the case where FH is applied and DMRSs in the case where FH is not applied, based on at least one of the separately defined given values and a PUSCH allocation duration. Alternatively, the inventors of this application have conceived defining the given value based on at least one of the mapping type and the PUSCH allocation duration (e.g., the number of symbols).

An embodiment according to the present invention will be described in detail below with reference to the drawings. In addition, a case where frequency hopping is applied to PUSCHs will be mainly described below. However, the embodiment is applicable as appropriate to a case where frequency hopping is applied to PUCCHs, too.

Furthermore, intra-slot frequency hopping for applying frequency hopping in 1 slow will be described as one example below. However, the embodiment is applicable as appropriate to inter-slot frequency hopping for applying frequency hopping between a plurality of slots, too. Furthermore, the following description will describe PUSCH transmission before RRC connection. However, the embodiment is not limited to this. The embodiment may be applied to PUSCH transmission during RRC reconnection (or RRC reconfiguration), or may not be applied to PUSCH transmission after RRC connection.

(First Aspect)

According to the first aspect, at least one of the number and positions of additional DMRSs for PUSCH transmission before RRC connection is controlled based on a given condition.

For example, given values are respectively defined for a case where frequency hopping (referred to as FH below) is not applied (FH disabled) and a case where FH is applied (FH enabled). A UE determines at least one of the number and the positions of the additional DMRSs based on the given value.

<FH Disabled>

For example, for PUSCHs to which FH is not applied (FH disabled), the UE determines an additional DMRS configuration (e.g., at least one of the number of additional DMRSs and mapping positions of the additional DMRSs) by using at least a first given value associated with FH disabled. Furthermore, the UE may decide the additional DMRS configuration by using at least one of a PUSCH mapping type and a PUSCH allocation duration (e.g., the number of symbols) in addition to the first given value.

There may be employed a configuration where at least one of the PUSCH allocation duration and mapping type may be notified to the UE by using at least one of downlink control information (or a PDCCH) and a broadcast signal before RRC connection, or use the given value or a given type in advance.

The UE may read the first given value as UL-DMRS-add-pos, and decide the additional DMRS configuration by referring to a table illustrated in FIG. 2A. In this case, the UE determines the number and the positions of additional DMRSs based on the first given value, the PUSCH allocation duration and the PUSCH mapping type.

The first given value may be defined in association with at least one of the PUSCH allocation duration and mapping type. A case where the first given value is defined in association with at least one of the PUSCH allocation duration and mapping type will be described below.

(1) For PUSCHs to which a mapping type A is applied and that have a given allocation duration, the UE assumes that the first given value is 2 (i.e., DMRS-add-pos=2). In this case, the UE may assume that up to two additional DMRSs at maximum can be transmitted during the PUSCH allocation duration (see FIG. 3A).

For example, the UE refers to a table illustrated in FIG. 3A, and transmits the two additional DMRSs during the PUSCH allocation duration when the PUSCH allocation duration is larger than a given number of symbols (e.g., 9 symbols). The UE may determine additional DMRS allocation symbols based on the table. In addition, in FIG. 3A, $1_0$ corresponds to positions of DMRSs to be transmitted irrespectively of the PUSCH allocation duration, and numbers other than $1_0$ correspond to the positions of the additional DMRSs.

Furthermore, when the PUSCH allocation duration is the given number of symbols (e.g., 8 or 9 symbols), the UE transmits one additional DMRS during the PUSCH allocation duration. Furthermore, when the PUSCH allocation duration is smaller than the 8 symbols (7 symbols or less), the UE performs control so as not to transmit the additional DMRS during the PUSCH allocation duration.

(2) For PUSCHs to which a mapping type B is applied and whose allocation duration is larger than 7 symbols, the UE assumes that the first given value is 2 (i.e., DMRS-add-pos=2). In this case, the UE may assume that up to two additional DMRSs at maximum can be transmitted during the PUSCH allocation duration (see FIG. 3A).

For example, the UE refers to the table illustrated in FIG. 3A, and transmits the two additional DMRSs during the PUSCH allocation duration when the PUSCH allocation duration is larger than the given number of symbols (e.g., 7 symbols). The UE may determine additional DMRS allocation symbols based on the table.

(3) For PUSCHs to which the mapping type B is applied and whose allocation duration is 7 symbols, the UE assumes that the first given value is 1 (i.e., DMRS-add-pos=1). In this case, the UE may assume that one additional DMRS is transmitted during the PUSCH allocation duration (see FIG. 3A).

(4) For PUSCHs to which the mapping type B is applied and whose allocation duration is smaller than 7 symbols, the UE assumes that the first given value is 0 (i.e., DMRS-add-pos=0). In this case, the UE may assume that the additional DMRS is not transmitted during the PUSCH allocation duration (see FIG. 3A).

Thus, the first given value is defined in association with at least one of the PUSCH allocation duration and mapping type, and the first given value is read as UL-DMRS-add-pos to determine the additional DMRS configuration. Consequently, even before RRC connection during which a higher layer signaling cannot be notified to the UE, it is possible to appropriately configure positions and the number of DMRSs during PUSCH transmission. As a result, it is possible to prevent deterioration of communication quality.

In addition, (1) to (4) have been described herein as definitions of the first given value. However, the definitions of the first given value are not limited to these. Part of contents of (1) to (4) may be changed or deleted, or new definitions may be added thereto.

For example, above (3) may be deleted, and (2) may be changed to (2)' as follows.

(2)' For PUSCHs to which the mapping type B is applied and whose allocation duration is 7 symbols or larger than the 7 symbols, the UE assumes that the first given value is 2 (i.e., DMRS-add-pos=2). In this case, the UE may assume that up to two additional DMRSs at maximum can be transmitted during the PUSCH allocation duration (see FIG. 4).

For example, the UE refers to a table illustrated in FIG. 4, and transmits two additional DMRSs during the PUSCH allocation duration when the PUSCH allocation duration is larger than a given number of symbols (e.g., 7 symbols). Furthermore, when the PUSCH allocation duration is the given number of symbols (e.g., 7 symbols), the UE transmits one additional DMRS during the PUSCH allocation duration. The UE may determine each additional DMRS allocation symbol based on the table.

In this case, it is possible to reduce the configuration of the first given value that is used before RRC connection, and consequently simplify a UE operation.

<FH Enabled>

For example, for PUSCHs to which FH is applied (FH enabled), the UE determines an additional DMRS configuration (e.g., at least one of the number of additional DMRSs and mapping positions of the additional DMRSs) by using at least a second given value associated with FH enabled. Furthermore, the UE may decide the additional DMRS configuration by using at least one of a PUSCH mapping type and a PUSCH allocation duration (e.g., the number of symbols) in addition to the second given value.

The second given value is configured independently from the first given value. In this case, a maximum value (e.g., 2) of the first given value associated with FH disabled, and a maximum value (e.g., 1) of the second given value associated with FH enabled may be configured independently (to, for example, different values). Consequently, even when the PUSCH allocation duration is configured differently according to whether or not FH is applied, it is possible to flexibly configure the DMRS configuration according to each case.

The UE may read the second given value as UL-DMRS-add-pos, and decide the additional DMRS configuration referring to the table illustrated in FIG. 2B. In this case, the UE determines the number and the positions of the additional DMRSs based on the second given value, the PUSCH allocation duration and the PUSCH mapping type.

One value may be defined for the second given value. For example, the second given value may be 1 (i.e., DMRS-add-pos=1). In this case, the UE assumes that the first given value is 1 (i.e., DMRS-add-pos=1). Furthermore, the UE may assume based on the PUSCH allocation duration that one additional DMRS at maximum can be transmitted during the PUSCH allocation duration.

For example, the UE refers to the table illustrated in FIG. 3B, and transmits one additional DMRS during the PUSCH allocation duration when the PUSCH allocation duration to which the mapping type A is applied is a given number of symbols (e.g., 7 symbols) or is larger than the given number of symbols (e.g., 6 symbols). In addition, in FIG. 3B, DMRS symbols are added to PUSCH allocation durations 4, 5 and 6 of the mapping type A, too, (i.e., $1_0$ is added to the first hop, and 0 is added to the second hop) in DMRS-add-pos=1 in the table illustrated in FIG. 2B. Furthermore, DMRS symbols are added to the PUSCH allocation duration 4 or shorter durations (e.g., 4 or <3) of the mapping type B, too, (i.e., $1_0$ is added to the first hop, and 0 is added to the second hop). Consequently, it is possible to appropriately configure a DMRS arrangement even when the one second given value is configured.

Additional DMRS allocation symbols may be determined based on the table. In addition, in FIG. 3B, $1_0$ of the first hop and 0 of the second hop of frequency hopping correspond to positions of DMRSs to be transmitted irrespectively of the PUSCH allocation duration. Furthermore, a number other than $1_0$ of the first hop, and a number (e.g., 4) of the second hop other than 0 correspond to additional DMRS positions.

Furthermore, when the PUSCH allocation duration to which the mapping type B is applied is larger than a given number of symbols (e.g., 4 symbols), the UE transmits one additional DMRS during the PUSCH allocation duration.

Furthermore, the UE may control transmission of DMRSs assuming that an additional DMRS is not transmitted during the PUSCH allocation duration in other cases. The other cases include at least one of PUSCH transmission to which the mapping type A is applied and whose allocation duration is smaller than 7 symbols (or 6 symbols or less), and PUSCH transmission to which the mapping type B is applied and whose allocation duration is smaller than 5 symbols (or 4 symbols or less).

Thus, the second given value is defined, and the first given value is read as UL-DMRS-add-pos to determine the additional DMRS configuration. Consequently, even before RRC connection during which a higher layer signaling cannot be notified to the UE, it is possible to appropriately configure positions and the number of DMRSs during PUSCH transmission. Furthermore, by independently defining the first given value associated with FH disabled and the second given value associated with FH enabled, it is possible to flexibly configure the additional DMRS configuration according to whether or not FH is applied. Consequently, it is possible to appropriately control transmission of the additional DMRSs, and prevent deterioration of communication quality.

(Second Aspect) According to the second aspect, a second given value associated with FH enabled is defined in association with at least one of a PUSCH allocation duration and mapping type.

The first aspect (e.g., FIG. 3 B) has described a case where one value is defined as the second given value. However, a plurality of the second given values may be defined based on at least one of the PUSCH allocation duration and mapping type. A case where the second given value is defined in association with at least one of the PUSCH allocation duration and mapping type will be described below. In addition, a first given value associated with FH disabled may be defined similar to the first aspect (e.g., FIG. 3A or FIG. 4).

<FH Enabled>

(1) For PUSCHs whose allocation duration is 7 symbols (larger than 6 symbols), a UE assumes that the second given value is 1 (i.e., DMRS-add-pos=1). In this case, the UE may assume that one additional DMRS at maximum can be transmitted during a PUSCH allocation duration (see FIG. 5). FIG. 5A corresponds to contents that reuses a table (e.g., FIG. 2B) used after RRC connection, and FIG. 5B corresponds to contents that is obtained by adding DMRS symbols to the table in FIG. 2B as illustrated in FIG. 3B. Hereinafter, a case where a table in FIG. 5A is used will be described. However, a table in FIG. 5B may be used instead of the table in FIG. 5A.

For example, the UE refers to the table illustrated in FIG. 5, and transmits one additional DMRS during the PUSCH allocation duration when the PUSCH allocation duration is a given number of symbols (e.g., 7 symbols). The UE may determine each additional DMRS allocation symbol based on the table.

(2) For PUSCHs to which a mapping type B is applied and whose allocation duration is 5 or 6 symbols, the UE assumes that the second given value is 1 (i.e., DMRS-add-pos=1). In this case, the UE may assume that one additional DMRS at maximum can be transmitted during the PUSCH allocation duration (see FIG. 5A).

For example, the UE refers to a table illustrated in FIG. 5, and transmits one additional DMRS during the PUSCH allocation duration when the PUSCH allocation duration to which the mapping type B is applied is a given number of symbols (e.g., 5 or 6 symbols). The UE may determine each additional DMRS allocation symbol based on the table.

(3) For PUSCHs to which the mapping type B is applied and whose allocation duration is smaller than 5 symbols (i.e., 4 symbols or less), the UE assumes that the second given value is 0 (i.e., DMRS-add-pos=0). In this case, the UE may assume that an additional DMRS is not transmitted during the PUSCH allocation duration (see FIG. 5A).

(4) For PUSCHs to which a mapping type A is applied and whose allocation duration is smaller than 7 symbols (or 6 symbols or less), the UE assumes that the second given value is 0 (i.e., DMRS-add-pos=0). In this case, the UE may assume that an additional DMRS is not transmitted during the PUSCH allocation duration (see FIG. 5A).

Thus, the second given value is defined in association with at least one of the PUSCH allocation duration and mapping type, and the second given value is read as UL-DMRS-add-pos to determine the additional DMRS configuration. Consequently, even before RRC connection during which a higher layer signaling cannot be notified to the UE, it is possible to appropriately configure positions and the number of DMRSs during PUSCH transmission. As a result, it is possible to prevent deterioration of communication quality.

In addition, (1) to (4) have been described herein as definitions of the second given value. However, the definitions of the second given value are not limited to these. Part of contents of (1) to (4) may be changed or deleted, or new definitions may be added thereto.

(Radio Communication System)

The configuration of the radio communication system according to one embodiment of the present invention will be described below. This radio communication system uses one or a combination of the radio communication method according to each of the above embodiment of the present invention to perform communication.

FIG. 6 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to those illustrated in FIG. 6.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The radio base station 11 and each radio base station 12 (or the two radio base stations 12) may be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 7:
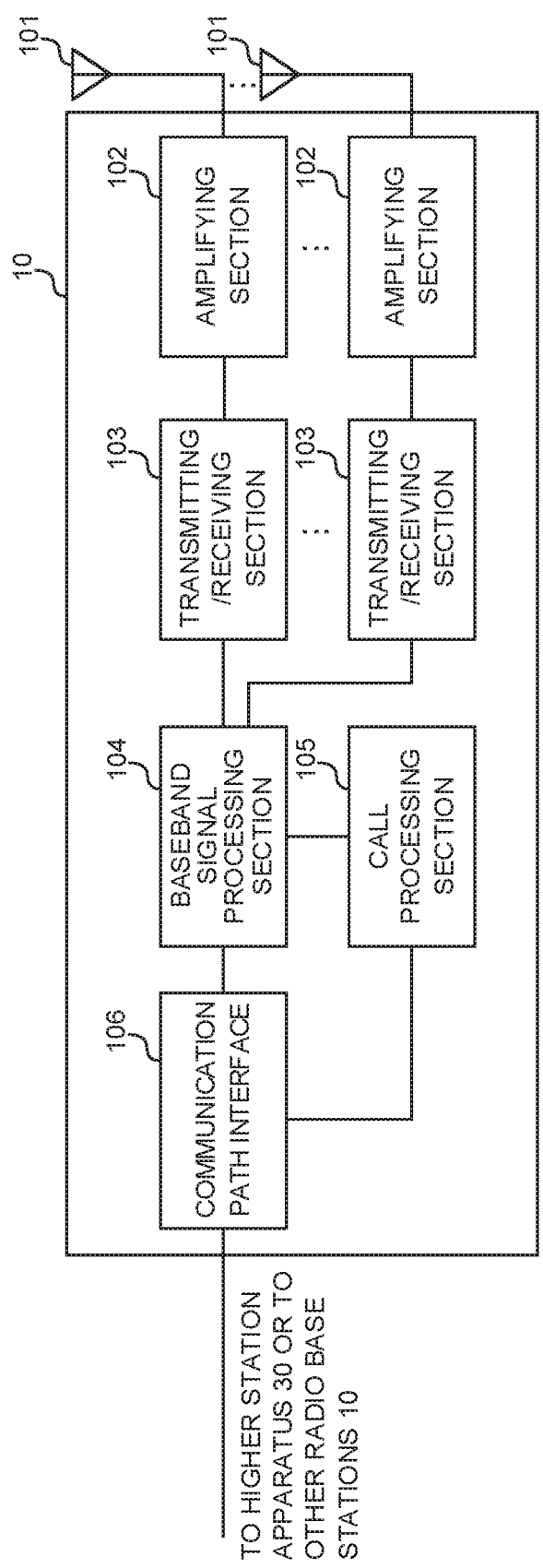
FIG. 7 is a diagram illustrating one example of an overall configuration of a radio base station according to the one embodiment of the present invention.

FIG. 7 is a diagram illustrating one example of an overall configuration of the radio base station according to the one embodiment of the present invention. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Furthermore, each transmitting/receiving section 103 receives uplink shared channels and Demodulation Reference Signals (DMRSs) of the uplink shared channels. Furthermore, each transmitting/receiving section 103 may transmit information related to whether or not FH is applied.

Figure 8:
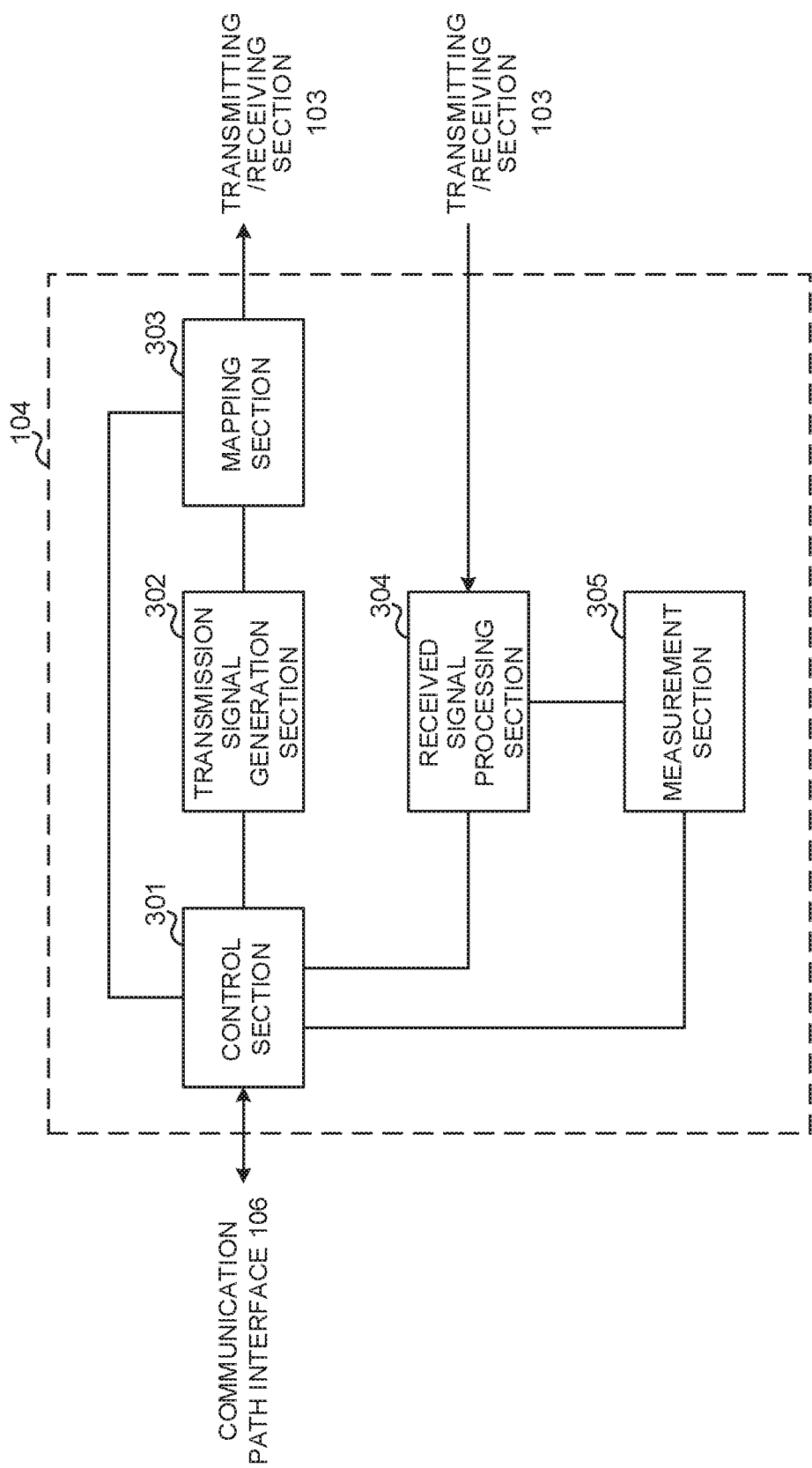
FIG. 8 is a diagram illustrating one example of a function configuration of the radio base station according to the one embodiment of the present invention.

FIG. 8 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of the downlink control signal and the downlink data signal based on a result obtained by judging whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

Furthermore, at least before Radio Resource Control (RRC) connection is configured, the control section 301 controls reception of DMRSs whose allocation is determined based on at least one of a given value, an uplink shared channel allocation duration and a mapping type. The given value may be defined separately per mapping type of the uplink shared channel, may be defined separately according to whether or not frequency hopping is applied, or may be separately defined per given allocation duration of a PUSCH.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a given radio resource based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

Figure 9:
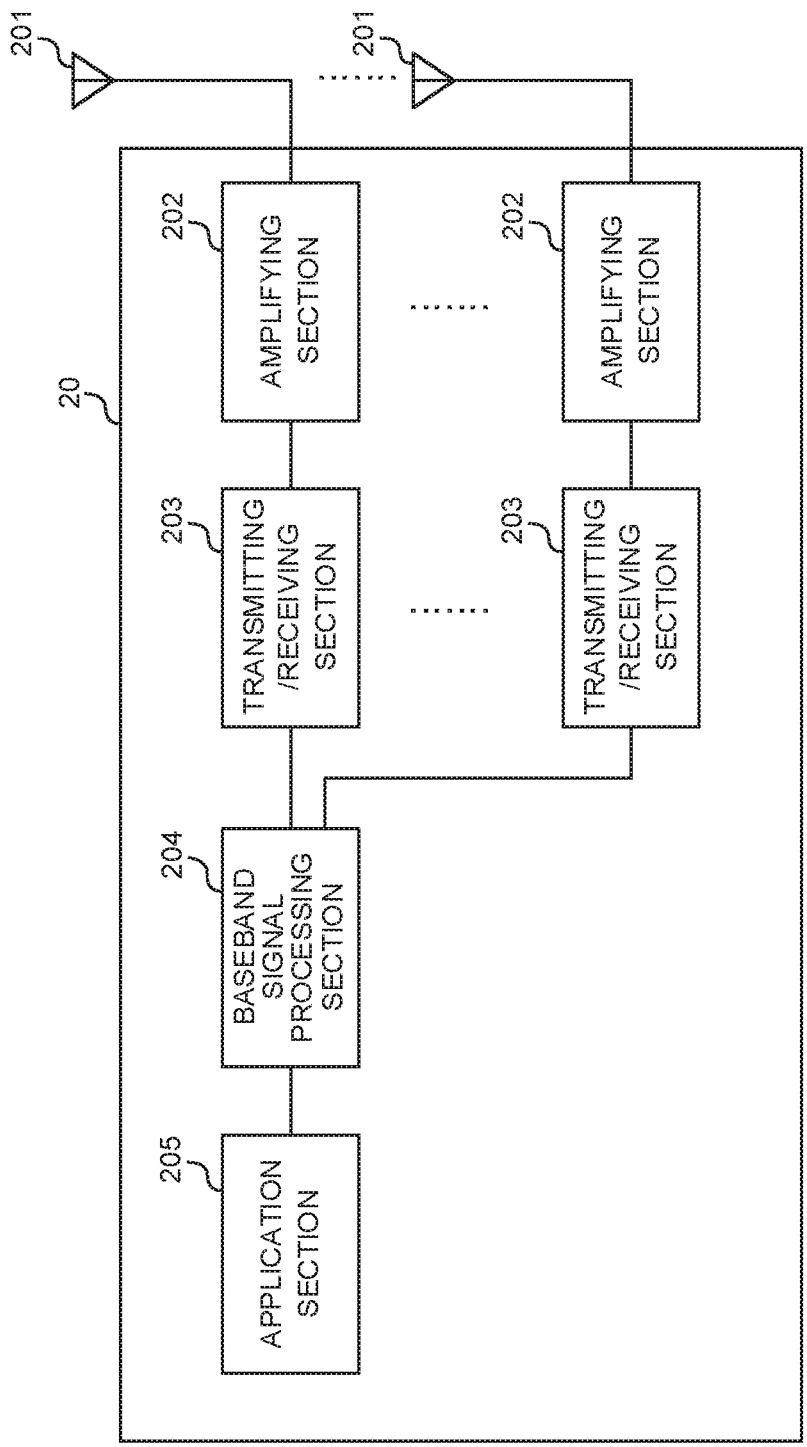
FIG. 9 is a diagram illustrating one example of an overall configuration of a user terminal according to the one embodiment of the present invention.

(User Terminal) FIG. 9 is a diagram illustrating one example of an overall configuration of the user terminal according to the one embodiment of the present invention. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmitting/receiving antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmitting/receiving section or may be composed of transmitting sections and receiving sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Furthermore, each transmitting/receiving section 203 transmits the uplink shared channels and the Demodulation Reference Signals (DMRSs) of the uplink shared channels. Furthermore, each transmitting/receiving section 203 may receive the information related whether or not FH is applied.

Figure 10:
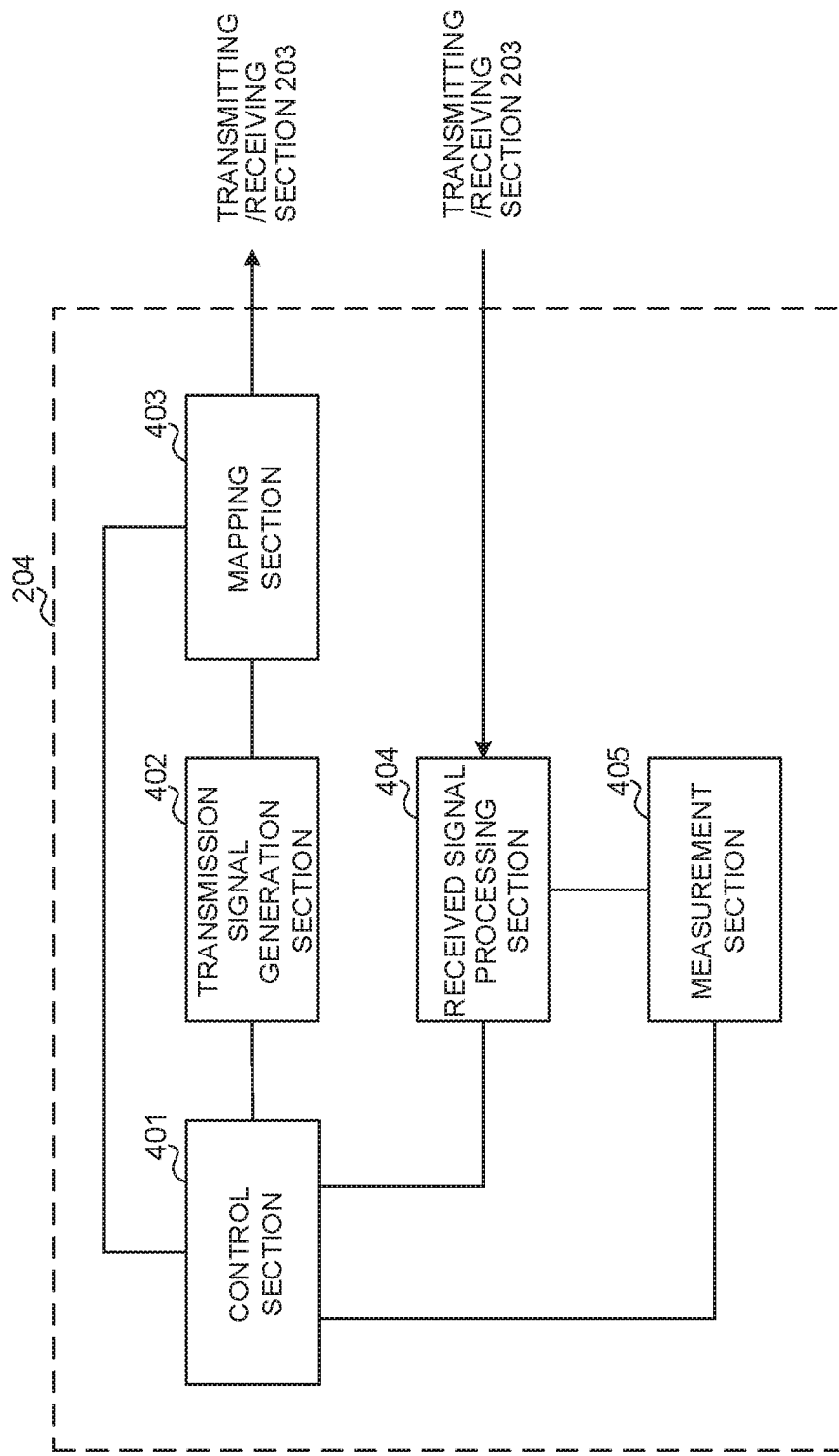
FIG. 10 is a diagram illustrating one example of a function configuration of the user terminal according to the one embodiment of the present invention.

FIG. 10 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by judging whether or not it is necessary to perform retransmission control on the downlink control signal and/or the downlink data signal.

Furthermore, at least before Radio Resource Control (RRC) connection is configured, the control section 401 determines allocation of DMRSs based on the given value and the uplink shared channel allocation duration. The given value may be defined separately per mapping type of the uplink shared channel, may be defined separately according to whether or not frequency hopping is applied, or may be separately defined per given allocation duration of the PUSCH.

When frequency hopping is applied to the uplink shared channel, one value may be defined as the given value (see FIG. 3B). Alternatively, when frequency hopping is applied to the uplink shared channel, the given values may be defined separately (e.g., as different values) according to at least one of the uplink shared channel allocation duration per hop and the mapping type of the uplink shared channel (see FIG. 5).

A maximum value of the given value defined in association with the case where frequency hopping is not applied, and a maximum value of the given value defined in association with the case where frequency hopping is applied may be configured to differ.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the receiving section according to the present invention.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration) In addition, the block diagrams used to describe the above embodiment illustrate blocks in function units. These function blocks (components) are realized by an optional combination of at least one of hardware and software. Furthermore, a method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection).

Figure 11:
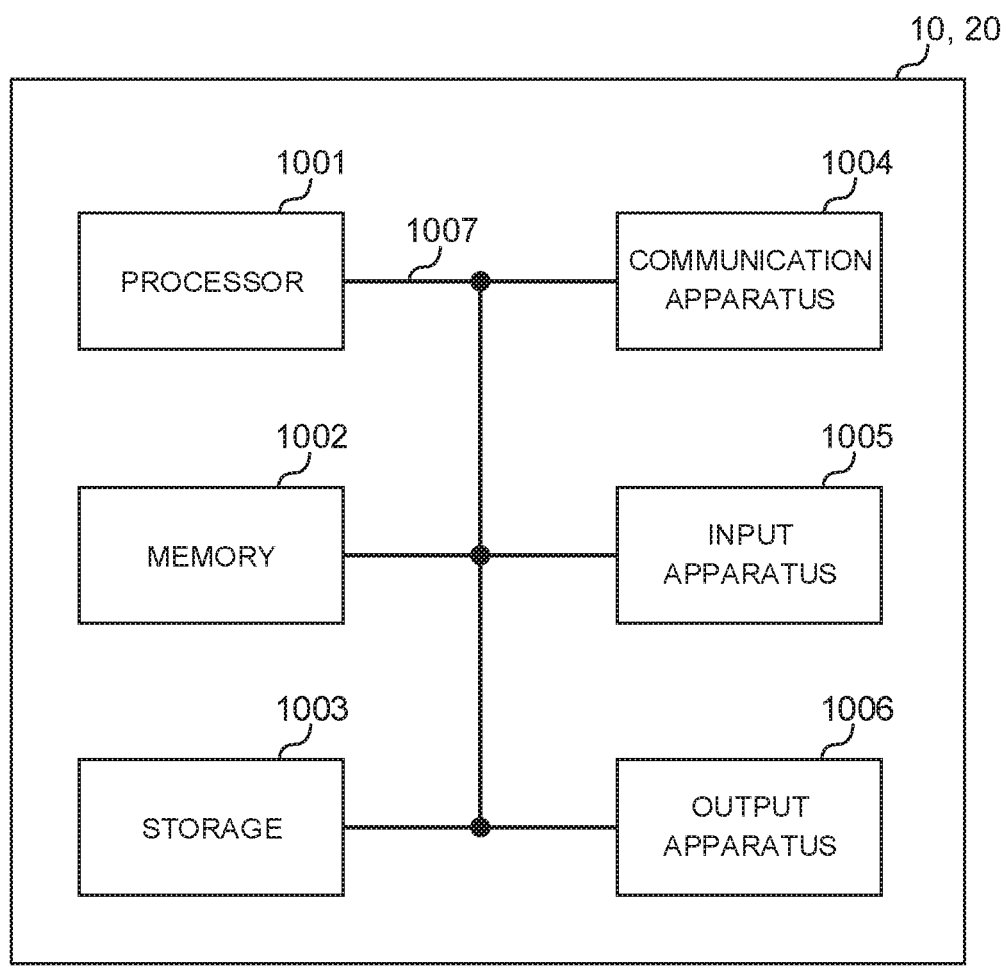
FIG. 11 is a diagram illustrating one example of hardware configurations of the radio base station and the user terminal according to the one embodiment of the present invention.

For example, the radio base station and the user terminal according to the one embodiment of the present disclosure may function as computers that perform processing of the radio communication method according to the present disclosure. FIG. 11 is a diagram illustrating one example of the hardware configurations of the radio base station and the user terminal according to the one embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates the only one processor 1001. However, there may be a plurality of processors. Furthermore, processing may be executed by 1 processor or processing may be executed by 1 or more processors concurrently, successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of wired and radio networks, and will be also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using a bus that differs per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in the present disclosure and each term that is necessary to understand the present disclosure may be replaced with terms having identical or similar meanings. For example, at least one of channels and symbols may be signals (signalings). Furthermore, a signal may be a message. A reference signal can be also abbreviated as an RS (Reference Signal), or may be also referred to as a pilotorapilot signal depending on standards to be applied. Furthermore, a Component Carrier (CC) may be referred to as a cell, a frequency carrier and a carrier frequency.

A radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

In this regard, the numerology may be a communication parameter to be applied to at least one of transmission and reception of a certain signal or channel. For example, the numerology may indicate at least one of, for example, a SubCarrier Spacing (SCS), a bandwidth, a symbol length, a cyclic prefix length, a Transmission Time Interval (TTI) length, the number of symbols per TTI, a radio frame configuration, specific filtering processing performed by a transceiver in a frequency-domain, and specific windowing processing performed by the transceiver in the time-domain.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies.

The slot may include a plurality of mini slots. Each mini slot may include one or a plurality of symbols in the time-domain. Furthermore, the mini slot may be referred to as a subslot. The mini slot may include a smaller number of symbols than those of the slot. The PDSCH (or the PUSCH) to be transmitted in larger time units than that of the mini slot may be referred to as a PDSCH (or PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol.

For example, 1 subframe may be referred to as a Transmission Time Interval (TTI), a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit such as a channel-coded data packet (transport block), code block and codeword, or may be a processing unit of scheduling or link adaptation. In addition, when the TTI is given, a time period (e.g., the number of symbols) in which a transport block, a code block and a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain.

Furthermore, the RB may include one or a plurality of symbols in the time-domain or may have the length of 1 slot, 1 mini slot, 1 subframe or 1 TTI. 1 TTI or 1 subframe may each include one or a plurality of resource blocks.

In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output at least from a higher layer to a lower layer or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/ embodiment described in the present disclosure and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least one of wired techniques (e.g., coaxial cables, optical fiber cables, twisted pairs and Digital Subscriber Lines (DSLs)) and radio techniques (e.g., infrared rays and microwaves), at least one of these wired techniques and radio technique are included in a definition of the transmission media.

The terms "system" and "network" used in the present disclosure can be compatibly used.

In the present disclosure, terms such as a "base Station (BS)", a "radio base station", a "fixed station", a "NodeB", an "eNodeB (eNB)", a "gNodeB (gNB)", an "access point", a "transmission point", a "reception point", a "transmission/reception point", a "cell", a "sector", a "cell group", a "carrier", a "component carrier" and a "Bandwidth Part (BWP)" can be compatibly used. The base station will be also referred to as terms such as a macro cell, a small cell, a femtocell or a picocell.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of at least one of the base stationandthebasestation subsystem that provides communication service in this coverage.

In the present disclosure, the terms "Mobile Station (MS)", "user terminal", "User Equipment (UE)" and "terminal" can be compatibly used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus or a reception apparatus. In addition, at least one of the base station and the mobile station may be a device mounted on a movable body or the movable body itself. The movable body may be a vehicle (e.g., a car or an airplane), may be a movable body that moves unmanned (e.g., a drone or a self-driving car) or may be a robot (a manned type or an unmanned type). In addition, at least one of the base station and the mobile station includes an apparatus, too, that does not necessarily move during a communication operation.

Furthermore, the radio base station in the present disclosure may be read as the user terminal. For example, each aspect/embodiment of the present disclosure may be applied to a configuration where communication between the radio base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above radio base station 10. Furthermore, words such as "uplink" and "downlink" may be read as words (e.g., a "side") that match device-to-device communication. For example, the uplink channel and the downlink channel may be read as side channels.

Similarly, the user terminal in the present disclosure may be read as the radio base station. In this case, the radio base station 10 may be configured to include the functions of the above user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements in an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, and next-generation systems that are expanded based on these systems. Furthermore, a plurality of systems may be combined (e.g., a combination of LTE or LTE-A and 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be regarded to "decide (determine)" judging, calculating, computing, processing, deriving, investigating, looking up (e.g., looking up in a table, a database or another data structure) and ascertaining.

Furthermore, "deciding (determining)" may be regarded to "decide (determine)" receiving (e.g., receiving information), transmitting (e.g., transmitting information), input, output and accessing (e.g., accessing data in a memory).

Furthermore, "deciding (determining)" may be regarded to "decide (determine)" resolving, selecting, choosing, establishing and comparing. That is, "deciding (determining)" may be regarded to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically, logically or by a combination of the physical and logical connections. For example, "connection" may be read as "access".

It can be understood that, when connected in the present disclosure, the two elements are "connected" or "coupled" with each other by using one or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". Words such as "separate" and "coupled" may be also interpreted in a similar manner.

When the words "include" and "including" and modifications of these words are used in the present disclosure, these words intend to be comprehensive similar to the word "comprising". Furthermore, the word "or" used in the present disclosure intends not to be an XOR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the disclosure of the present disclosure is intended for exemplary explanation, and does not bring any restrictive meaning to the invention according to the present disclosure.

The invention claimed is:

1. A terminal comprising:
   a processor that determines a position of an additional demodulation reference signal (DMRS), which is a DMRS in addition to a first DMRS symbol, based on a radio resource control (RRC) parameter indicating the position of the additional DMRS, and determines the position of the additional DMRS by assuming the RRC parameter is equal to one of:
      a first value associated with frequency hopping of a physical uplink shared channel (PUSCH) being enabled, and
      a second value associated with frequency hopping of the PUSCH being disabled; and
   a transmitter that transmits the additional DMRS according to an allocation duration of the PUSCH,
   wherein the first value if the frequency hopping is enabled and the second value if the frequency hopping is disabled are different,
   if the frequency hopping is enabled, the processor determines the position of the additional DMRS by assuming the RRC parameter is equal to the first value, and
   if the frequency hopping is disabled, the processor determines the position of the additional DMRS by assuming the RRC parameter is equal to the second value.

2. The terminal according to claim 1, wherein if the frequency hopping is enabled, the first value is 1.

3. The terminal according to claim 1, wherein if the frequency hopping is disabled, the second value is 2.

4. The terminal according to claim 1, wherein the first value and the second value are configured individually.

5. The terminal according to claim 1, wherein the processor determines a position of a DMRS, including the additional DMRS and the first DMRS, based on a predefined position value of the first DMRS, the allocation duration of the PUSCH and a PUSCH mapping type.

6. The terminal according to claim 2, wherein the processor determines a position of a DMRS, including the additional DMRS and the first DMRS, based on a predefined position value of the first DMRS, the allocation duration of the PUSCH and a PUSCH mapping type.

7. The terminal according to claim 3, wherein the processor determines a position of a DMRS, including the additional DMRS and the first DMRS, based on a predefined position value of the first DMRS, the allocation duration of the PUSCH and a PUSCH mapping type.

8. The terminal according to claim 4, wherein the processor determines a position of a DMRS, including the additional DMRS and the first DMRS, based on a predefined position value of the first DMRS, the allocation duration of the PUSCH and a PUSCH mapping type.

9. A radio communication method for a terminal, comprising:
   determining a position of an additional demodulation reference signal (DMRS), which is a DMRS in addition to a first DMRS symbol, based on a radio resource control (RRC) parameter indicating the position of the additional DMRS, and determines the position of the additional DMRS by assuming a higher layer the RRC parameter equals is equal to one of:
      a first value associated with frequency hopping of a physical uplink shared channel (PUSCH) being enabled, and
      a second value associated with frequency hopping of the PUSCH being disabled; and
   transmitting the additional DMRS according to an allocation duration of the PUSCH,
   wherein the first value if the frequency hopping is enabled and the second value if the frequency hopping is disabled are different,
   if the frequency hopping is enabled, the terminal determines the position of the additional DMRS by assuming the RRC parameter is equal to the first value, and
   if the frequency hopping is disabled, the terminal determines the position of the additional DMRS by assuming the RRC parameter is equal to the second value.

10. A base station comprising:
    a processor that determines a position of an additional demodulation reference signal (DMRS) which is a DMRS in addition to a first DMRS symbol, based on a radio resource control (RRC) parameter indicating the position of the additional DMRS, and determines the position of the additional DMRS by assuming the RRC parameter is equal to one of:
       a first value associated with frequency hopping of a physical uplink shared channel (PUSCH) being enabled, and
       a second value associated with frequency hopping of the PUSCH being disabled; and
    a receiver that receives the additional DMRS transmitted according to an allocation duration of the PUSCH, wherein the first value if the frequency hopping is enabled and the second value if the frequency hopping is disabled are different, if the frequency hopping is enabled, the processor determines the position of the additional DMRS by assuming the RRC parameter is equal to the first value, and if the frequency hopping is disabled, the processor determines the position of the additional DMRS by assuming the RRC parameter is equal to the second value.

\* \* \* \* \*